United States Patent [19]
Brücken et al.

[11] Patent Number: 5,466,352
[45] Date of Patent: Nov. 14, 1995

[54] METHOD AND APPARATUS FOR PROCESSING WASTE SULFURIC ACID

[75] Inventors: Volker Brücken, Königstein; Manfred Pötzschke, Kronberg; Bernd Langner, Winsen; Michael Stelter, Winsen/Scharmbeck, all of Germany

[73] Assignee: Metallgesellschaft Aktiengesellschaft, Frankfurt, Germany

[21] Appl. No.: 261,658

[22] Filed: Jun. 17, 1994

Related U.S. Application Data

[63] Continuation of Ser. No. 950,387, Sep. 23, 1992, abandoned.

[30] Foreign Application Priority Data

Sep. 24, 1991 [DE] Germany ............. 41 31 794.7

[51] Int. Cl.[6] .................................. B01D 61/44
[52] U.S. Cl. .................. 204/182.4; 204/182.5
[58] Field of Search ............ 204/182.4, 182.5, 204/301

[56] References Cited

U.S. PATENT DOCUMENTS

| | | | |
|---|---|---|---|
| 3,616,385 | 10/1971 | Kloss | 204/182.4 |
| 3,673,067 | 6/1972 | Harwood et al. | 204/182.4 |
| 4,715,939 | 12/1987 | Ball et al. | 204/182.4 |
| 4,717,450 | 1/1988 | Shaw et al. | 162/29 |
| 4,740,281 | 4/1988 | Chlanda et al. | 204/151 |
| 4,802,966 | 2/1989 | Aoki et al. | 204/182.4 |
| 5,162,076 | 11/1992 | Chiao et al. | 204/182.4 |

FOREIGN PATENT DOCUMENTS

| | | |
|---|---|---|
| 0405619 | 1/1991 | European Pat. Off. |
| 9006168 | 6/1990 | WIPO |

*Primary Examiner*—John Niebling
*Assistant Examiner*—Arun S. Phasge
*Attorney, Agent, or Firm*—Sprung Horn Kramer & Woods

[57] ABSTRACT

A method for processing waste sulfuric acid which is contaminated with halides and has an acid content up to 40% which comprises subjecting the waste sulfuric acid to an electrodialysis in which the electric field causes the univalent halides to permeate through an anion exchange membrane and to be selectively removed while the divalent sulfate ions of the sulfuric acid are substantially retained, the sulfuric acid leaving the electrodialyzer being almost entirely free of halides. A corresponding apparatus is also provided.

9 Claims, 1 Drawing Sheet

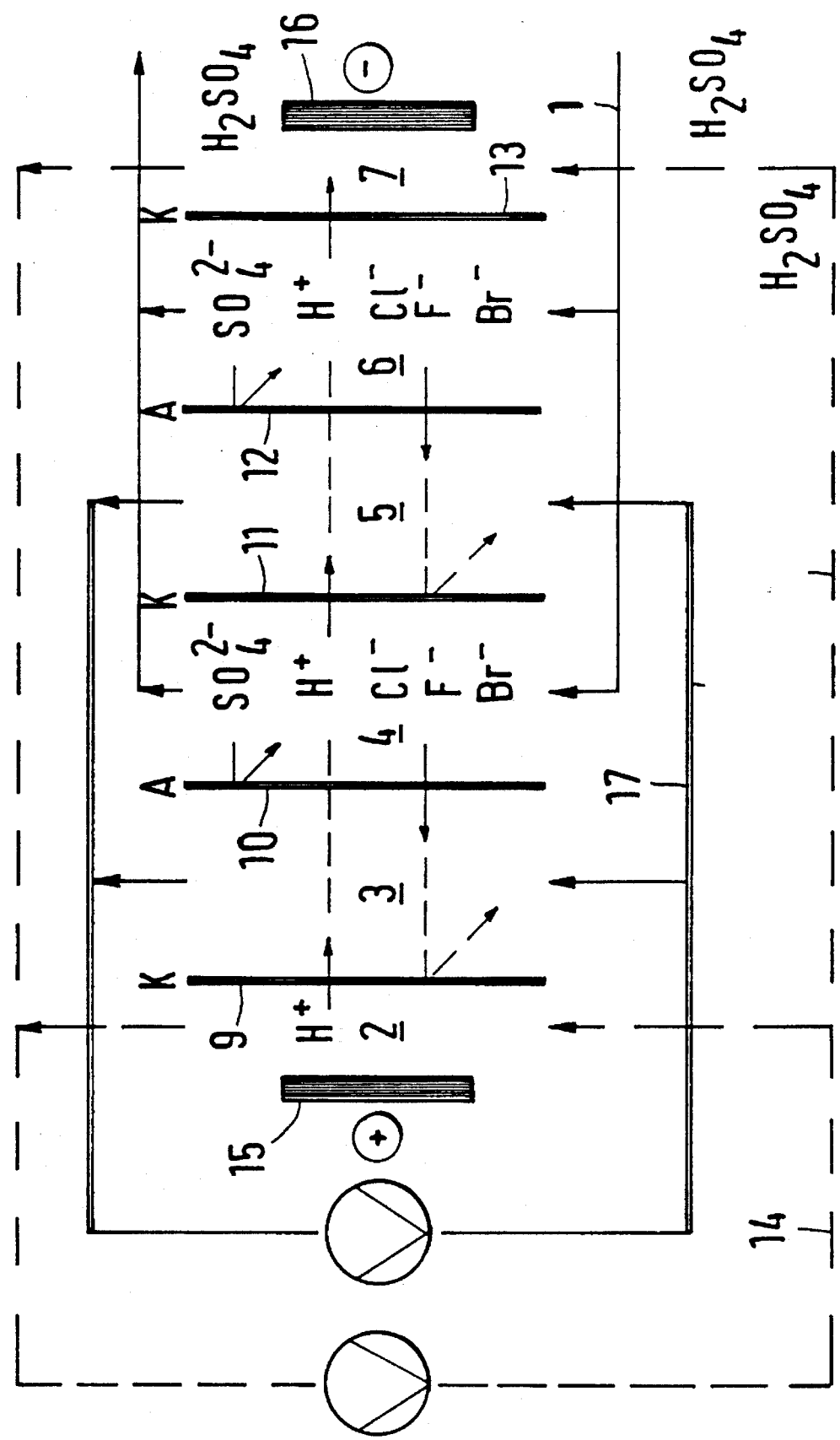

METHOD AND APPARATUS FOR PROCESSING WASTE SULFURIC ACID

This application is a continuation of application Ser. No. 07/950,387, filed Sep. 23, 1992, now abandoned.

This invention relates to a method and an apparatus for processing waste sulfuric acid which is contaminated with halides, particularly chlorides, fluorides and bromides, and has an acid content up to 40%.

Important sources for the production of waste sulfuric acid are, i.a., the metallurgical and chemical industries and power supply companies. For instance, waste sulfuric acids which contain up to 40 volume percent sulfuric acid and are contaminated with halides, particularly chlorides, fluorides, and bromides, are formed by the thermal processing of sulfur-containing raw materials, supplementary materials, and residual materials. Such waste sulfuric acids having a relatively low sulfuric acid content have previously been disposed of by being dumped into the ocean or have been neutralized with milk of lime and sodium hydroxide solution and the resulting gypsum or hydroxice sludge has been dumped or the dissolved neutral salts, such as $CaBr_2$, $CaCl_2$ or $NaBr$, $NACl$, and $Na_2SO_4$ have been introduced into rivers or into the ocean. Such practices will become increasingly problematic in the future owing to more stringent regulations regarding the protection of the environment and to the fact that the availing dumping spaces are decreasing and are becoming much more expensive. For this reason the processing of such waste sulfuric acids is gaining in importance.

From the periodical MM Maschinenmarkt 97 (1991), 22, pages 20 to 25, it is known that waste acid contaminated with metal ions can be processed by a dialysis, which is effected with ion exchange membranes and in which the motive force is due only to a concentration gradient, by which certain substances are caused to migrate through semipermeable membranes. Extraneous energy, such as pressure or electric power, is not required for that process. The dialyzer consists of a series of membranes and of spacers, which define intermediate chambers, in adjacent ones of which waste acid flows from bottom to too and water from top to bottom. The difference between the electrolyte concentrations of the two streams is compensated in that only the acid ions migrate through the membranes whereas the metal ions are retained. Owing to the countercurrent operation a maximum concentration difference is maintained throughout the length of the membranes so that the free acid is substantially completely separated in one pass through series of membranes. Dialysis is typically employed in surface-finishing technology, e.g., in the recovery of pickling acids and etching electrolytes. As a rule, the acid is the valuable material, which is recovered and recycled to the pickling bath, and the metals must be removed from the system so that they will not become enriched.

It is an object of the present invention to provide for the processing of waste sulfuric acid which is contaminated with halides, particularly chlorides, fluorides, and bromides, a method by which chlorides, fluorides, and bromides can be removed from relatively large amounts of waste sulfuric acid by a relatively simple plant technology and with a relatively small power requirement.

That object is accomplished in that the waste sulfuric acid, which is contaminated with halides, preferably chlorides, fluorides, and bromides, and contains up to 40% acid, is subjected to an electrodialysis, in which the electric field causes the univalent halides to permeate through the anion exchange membrane and to be selectively removed whereas the divalent sulfate ions of the sulfuric acid are substantially retained so that the sulfuric acid leaving the electrodialyzer is almost entirely free of halides.

The concentration of the halides which have been removed is increased in a separate circuit. In dependence on the form in which the halides are contained in the contaminated waste sulfuric acid they are removed either as neutral salts or as a hydrohalic acid, such as hydrochloric acid, hydrofluoric acid, and hydrobromic acid.

In the electrodialyzer an additional circuit is provided for recycling the electrode-purging liquor, which preferably consists of an electrolyte which does not release gaseous pollutants. Such a measure will be desirable to avoid formation of chlorine gas, particularly if high current densities, i.e., high anode potentials, are employed.

Hydrochloric acid which contains up to 1.0% acid, and preferably 0.1 to 0.5% acid, is suitably employed for recycling the halide-containing concentrate, and sulfuric acid containing up to 5.0% and preferably 0.1 to 2.5%, acid is desirably circulated as the electrode-purging liquor.

According to a special feature of the method in accordance with the invention the volume rate of the waste sulfuric acid contaminated with halides is 5 to 100 l/m² h, preferably 20 to 50 l/m² h, and the average current density is 5 to 50 mA/cm², preferably 10 to 20 mA/cm².

It is known from the periodical MM Maschinenmarkt 97 (1991), 22, pages 20 to 25 that salt and acid can be separated by two-chamber electrodialysis using bipolar membranes in a method in which a direct current voltage field is applied so that the acid anions are removed through an anion exchange membrane from the waste acid and together with protons generated at a bipolar membrane are caused to form a free acid whereas the metal cations are retained and removed. However, in that publication it is not contemplated to process waste sulfuric acid which is contaminated with halides.

In the apparatus provided in accordance with the invention to carry out the method, anion exchange and cation exchange membranes are arranged in alternation between a pair of electrodes and define chambers and the waste sulfuric acid and the concentrate being circualted are conducted along the membranes from bottom to top in respective adjacent chambers. The electrodes are purged by a circulating liquor, which also flows from bottom to top.

The invention will be explained hereinafter with reference to an example and to the principle of the electrodialyzing process and in conjunction with the accompanying drawing wherein:

The FIGURE is a flow sheet of the process of the invention.

The sulfur dioxide-containing gases to be supplied to contact process plants for producing sulfuric acid must be purified and that purification results in a formation of halide-containing waste sulfuric acid. To dehalogenate that contaminated waste sulfuric acid it is fed as a stream 1 at a volume rate of 25 l/m² h to an electrodialyzer 8, which comprises a plurality of cells 2, 3, 4, 5, 6, 7, which have opposite polarities in alternation and are defined by 10 anion-exchanging membranes and 11 cation-exchanging membranes 9, 10, 11, 12, 13 having a total effective membrane surface area of 0.372 m². 1% sulfuric acid is flowing through the cells 2, 7 for purging the cathode 15 and the anode 16. Between the cells 2 and 7, a plurality of cells 3, 4, 5, 6 are arranged, which have opposite polarities in alternation and through which the waste sulfuric acid and the concentrate in a 0.2% hydrochloric acid 17 are circulated in adjacent cells.

In the following Table the degrees of separation of several ions are stated in dependence on the cell voltage $U_z$ (5, 10, 20 volts). In case of a contaminated waste sulfuric acid composed of

| | |
|---|---|
| Cl | 5.3 g/l |
| F | 3.0 g/l |
| Br | 0.2 g/l |
| SO$_4$ | 18.5 g/l | the optimum dehalogenation is effected at a cell voltage of 10 volts and an average current density of 12 mA/cm$^2$.

After the waste sulfuric acid has been subjected to electrodialysis in two stages, 80% of the chlorides, 90% of the bromides, and 13% of the fluorides have been removed. 20% of the sulfates combined as sulfuric acid are also removed. Fluorides are removed in a comparatively inadequate amount, presumably because complex fluorine compounds are present.

| | | Test Conditions | | | | | |
|---|---|---|---|---|---|---|---|
| $V_A$ | $U_z$ | I | | Degree of separation, % | | | |
| l/m$^2$ h | V | mA cm$^2$ | Stage | Cl$^-$ | F$^-$ | Br$^-$ | SO$_4^{2-}$ |
| 25 | 5 | 5 | 1 | 3.0  28 | 2.8   7 | 0.1  60 | 17.4  6 |
| 25 | 5 | 5 | 2 | 2.3  57 | 2.6  13 | 0.05 75 | 15.1 18 |
| 55 | 5 | 5 | 3 | 1.4  74 | 2.4  20 | 0.02 90 | 13.7 26 |
| 25 | 5 | 5 | 4 | 0.8  85 | 2.2  26 | 0.01 95 | 12.0 35 |
| 25 | 10 | 19 | 1 | 2.5  53 | 2.9   3 | 0.06 70 | 15.4 17 |
| 25 | 10 | 12 | 2 | 1.1  80 | 2.6  13 | 0.02 90 | 13.1 29 |
| 25 | 10 | 10 | 3 | 0.35 93 | 2.2  26 | 0.01 95 | 10.3 44 |
| 25 | 10 | 9 | 4 | 0.11 98 | 1.7  43 | 0.01 95 | 7.6 59 |
| 25 | 20 | 60 | 1 | 0.9  83 | 1.7  43 | 0.02 90 | 7.6 59 |
| 25 | 20 | 18 | 2 | 0.12 98 | 0.6  80 | 0.01 95 | 2.2 88 |
| 25 | 20 | 7 | 3 | 0.02 99 | 0.2  93 | 0.01 95 | 0.8 95 |
| 25 | 20 | 2 | 4 | 0.01 99 | 0.2  93 | 0.01 95 | 0.7 96 |
| 50 | 10 | 13 | 1 | 3.35 37 | 2.80  6 | 0.08 60 | 17.2  7 |
| 50 | 10 | 12 | 2 | 2.15 60 | 2.85 12 | 0.03 85 | 16.1 13 |
| 50 | 10 | 10 | 3 | 1.40 73 | 2.55 15 | 0.02 90 | 14.4 22 |
| 50 | 10 | 10 | 4 | 0.85 84 | 2.35 22 | 0.01 95 | 12.9 30 |
| | | Initial solution | | 5.3 | 3.0 | 0.2 | 18.5 |

In order to minimize the relatively large leakage of sulfuric acid, the volume rate of waste sulfuric acid is increased to 50 l/m$^2$ h and the waste acid is subjected to electrodialysis at a cell voltage of 10 volts. The smallest leakage of sulfate in conjunction with an effective removal of the halides is achieved by an electrodialysis of the waste sulfuric acid in two stages. 60% of the clorides, 85% of the bromides, and 13% of the fluorides are removed from the waste sulfuric acid and the sulfate loss amounts to 13%.

The advantages afforded by the invention are particularly seen in that a substantial part of the waste sulfuric acid returned to the production process and be converted to a marketable product. Because problems do not arise in the selective separation of the halides from waste sulfuric acid and because the leakage of sulfates is relatively small, the expenditure involved in neutralizing and dumping can distinctly be reduced. As a result, much less neutral salts are introduced into the receiving waters and the rate of sewage is also reduced.

It will be appreciated that the instant specification and claims are set forth by way of illustration and not limitation, and that various modifications and changes may be made without departing from the spirit and scope of the present invention.

What is claimed is:

1. A method for processing waste sulfuric acid by electrodialysis wherein said waste acid is derived from the purification of a sulfur dioxide containing gas which is contaminated with hydrohalic acids and has an acid content in the order of magnitude of 1.85% up to 40% which comprises subjecting the waste sulfuric acid to an electrodialysis in which the electric field causes the univalent halides to permeate through an anion exchange membrane and to be selectively removed while the divalent sulfate ions of the sulfuric acid are retained, the sulfuric acid leaving the electrodialyzer being almost entirely free of halides, the permeate containing the separated halides in the form of hydrohalic acids, and recovering said permeate wherein said permeate is recycled.

2. A method according to claim 1, including the further steps of purging the electrodes with an electrolyte, and recycling the electrolyte.

3. A method according to claim 2, wherein the electrolyte consists of sulfuric acid having a concentration up to 5.0%.

4. A method according to claim 1, wherein the recycled solution of permeate comprises hydrochloric acid having a concentration up to 1.0%.

5. A method according to claim 1, wherein the volume rate of waste sulfuric acid is from about 5 to 100 l/m$^2$h and is from the contact process.

6. A method according to claim 1, the average current density is from about 5 to 50 mA/cm$^2$.

7. A method according to claim 1, including the further step of purging the electrodes with an electrolyte, the recycled solution of permeate comprising hydrochloric acid having a concentration of 0.1 to 0.5%, the electrolyte consisting of sulfuric acid having a concentration of 0.1 to 2.5%, the volume rate of waste sulfuric acid being from about 20 to 50 l/m$^2$h, and the average current density being from about 10 to 20 mA/cm$^2$.

8. The process according to claim 1, wherein the hydrohalic acid is hydrocloric acid.

9. The process according to claim 1, wherein the hydrohalic acid is hydrofluoric acid or hydrobromic acid.

* * * * *